United States Patent [19]
Olson

[11] 3,891,109
[45] June 24, 1975

[54] WAGON WITH ELONGATE CONVEYOR HOUSING AS UNLOADER AND DRAYAGE HITCH

[76] Inventor: Carroll G. Olson, Rural Rt. No. 1, Atkinson, Nebr. 68713

[22] Filed: Sept. 19, 1974

[21] Appl. No.: 507,564

[52] U.S. Cl. ............ 214/519; 214/83.32; 280/493; 280/400; 111/7
[51] Int. Cl.² .......................................... B60P 1/40
[58] Field of Search............. 214/83.32, 83.26, 519, 214/520, 521, 522, 42 R, 42 A; 111/7; 239/661, 675; 198/233; 180/14, 53; 280/400, 402, 420, 421, 422

[56] References Cited
UNITED STATES PATENTS
3,752,092  8/1973  Vinyard .................................. 111/7
3,835,951  9/1974  Hundt ................................. 280/421

FOREIGN PATENTS OR APPLICATIONS
252,123  2/1967  Austria ........................... 214/83.32

Primary Examiner—Albert J. Makay
Attorney, Agent, or Firm—George R. Nimmer

[57] ABSTRACT

Disclosed are cargo-carrying wagons equipped with a lineally elongate conveyor having a rearward intake-end communicating with a low elevation of the wagon cargo-storage compartment, the conveyor being provided with an elongate external tubular housing including a forward outlet-end for cargo discharge and the conveyor housing being pivotably associated with the forwardly disposed drayage or towing vehicle. For apt employment with an agricultural corn planter and analagous towing vehicles having a plurality of laterally spaced cargo-holding bins, an intermediate-hopper underlies the conveyor outlet-end and a pair of horizontal laterally extending secondary-conveyors communicate with the hopper interior and ultimately supply cargo to the cargo-holding bins.

7 Claims, 6 Drawing Figures

PATENTED JUN 24 1975   3,891,109

SHEET 1

PATENTED JUN 24 1975

3,891,109

SHEET 2

3,891,109

WAGON WITH ELONGATE CONVEYOR HOUSING AS UNLOADER AND DRAYAGE HITCH

Rollably towable wagon vehicles are commonly employed for agricultural and industrial purposes to supply flowable cargo to a desired working site, the cargo being unloadably discharged from the wagon either manually or mechanically at the working site. For towing the wagon vehicle, there is necessarily some type of hitch means extending forwardly of the wagon and for pivotably associating the wagon to the drayage means, which pivotal association about a vertical hitch-axis is preferably a removable connection between wagon and dray. For such rollably towable wagon vehicles of the prior art, particularly those having mechanical unload capability, the pivotal hitch means to the drayage vehicle is oftentimes objectionably complicated, cumbersome, expensive, or unreliable.

It is accordingly the general object of the present invention to provide improved hitch means and mechanical unloading means for rollably towable wagon vehicles.

It is another general object of the present invention to provide improved hitching and unloading means for rollable wagons and adapted for various towing means and for supplying various kinds flowable cargo to agricultural or industrial working sites.

Ancillary general objects include the capability for continuous unloading of the cargo, even while the wagon is being towed, such as for example with an agricultural corn planter drayage means equipped with apt cargo-holding bins.

With the above and other objects and advantages in view, which will become more apparent as this description proceeds, the towable cargo-carrying rollable wagon generally comprises an elongate forwardly extending conveyor lying along a vertical plane and having a rearward intake-end communicating with a low elevation of the wagon cargo-storage compartment and also a forward discharge-end, the conveyor being provided with an elongate external tubular housing connected to the wagon and also including an outlet-end adjacent the conveyor discharge-end, the conveyor tubular housing forwardly remote of the wagon cargo-storage compartment being pivotably associated along a vertical hitch-axis to the drayage vehicle.

In the drawing, wherein like characters refer to like parts in the several views, and in which.

Figure 1:
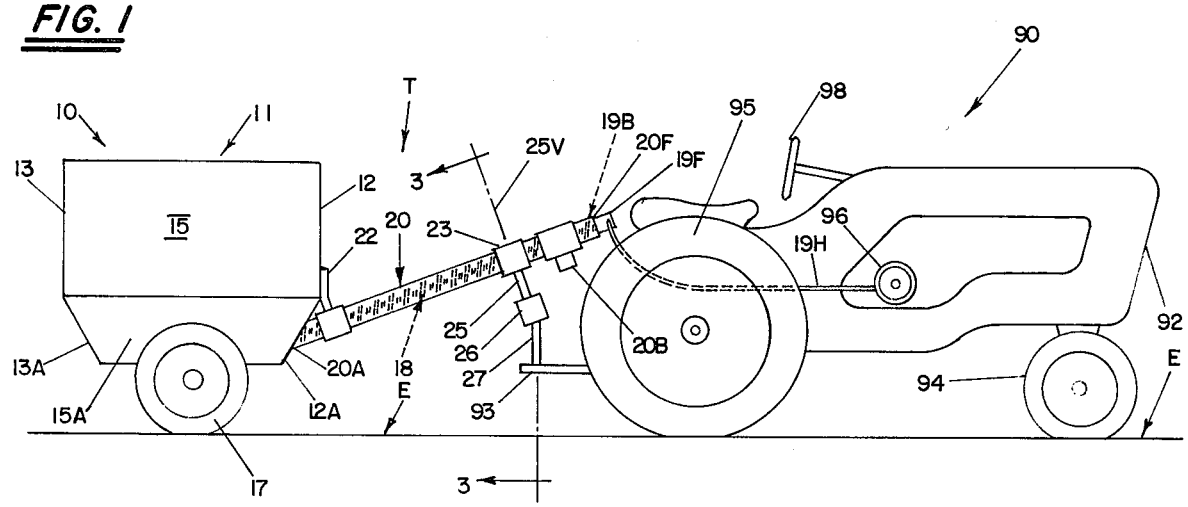
FIG. 1 is a side elevational view of a representative embodiment of the wagon concepts herein and having an elongate conveyor housing as unloader and drayage hitch means, a conventional farm tractor being depicted as the drayage or towing means.
Figure 2:
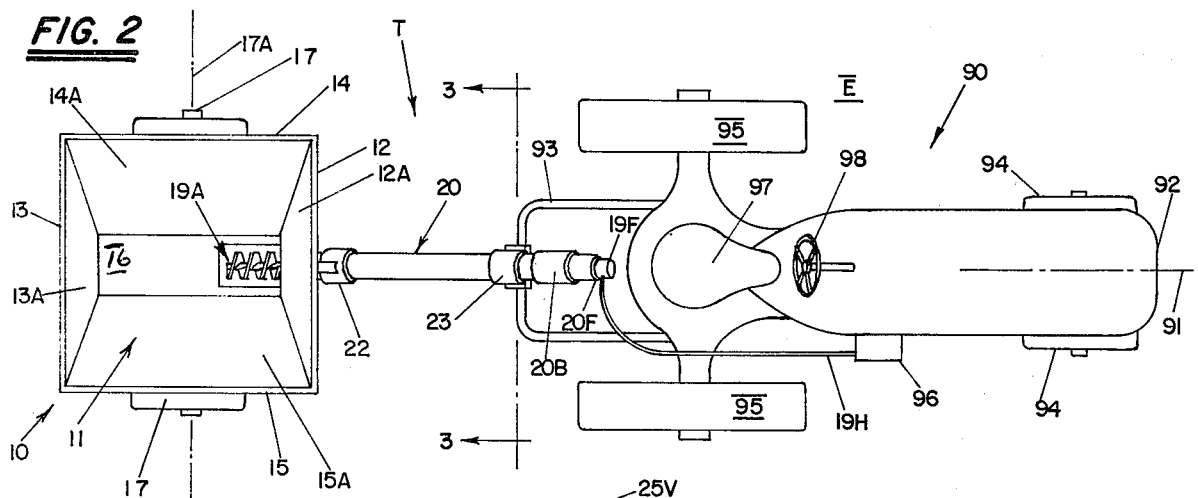
FIG. 2 is a top plan view of the FIG. 1 embodiment.

The conventional farm tractor drayage means indicated as 90 in FIGS. 1 and 2 extends lengthwise along a substantially horizontal longitudinal central vehicle-axis 91, the tractor having a transverse or lateral forward-end 92, a lateral rear-end 93 (herein as the tractor drawbar 93), smaller front-wheels 94, and rear-wheels 95. Tractor vehicle 90 is of the typical self-propelled type i.e., having its own power plant such as an internal combustion engine, to allow travel along a suitable underlying substrate e.g. earth's surface "E." In this vein, typical farm tractor 90 might be provided with an auxiliary power source, sometimes called power-take-off or "pto" 96, to drive attachments such as the fluid motors for auger conveyors 18, etc. The tractor chassis is customarily provided with an elevated operator's seat 97 and a steering wheel 98 for turning front-wheels 94.

The towable and unloadable basic embodiment "T" shown in FIGS. 1 and 2 comprises a cargo-carrying rollable wagon 10 having an interior cargo-storage compartment 11 predominately defined by four interconnected vertical rectangular panels including front-panel 12, rear-panel 13, left-panel 14, and right-panel 15. Cargo-storage compartment 11 has a low elevational sump portion defined by rectangular floor-panel 16 and too by four sloping interconnected trapezoidal panels 12A–15A/. A low elevation of cargo-storage compartment 11, herein as a forward floor-opening 16A, is provided with cargo egress which is synonymous with the conveyor rearward intake-end e.g., 19A. Wagon 10 is rollable along surface "E" by a pair of laterally separated tires 17 revolvable about horizontal axis 17A.

There is connected to the wagon 10 an elongate conveyor lying along a vertical plane and extending linearly longitudinally forwardly from the wagon. The forwardly extending conveyor has a rearward intake-end communicating with a low elevation (e.g., at 16A) of the wagon cargo-storage compartment 11 and a forward discharge-end whereat the flowable cargo is unloaded. Preferably, as shown herein, the elongate conveyor takes the form of a lengthy helical auger 18 comprising a linearly extending central-shaft 18A to which helical flighting 18F is attached. The auger rearward intake-end 19A is located at low elevation (e.g., 16A) of the cargo-storage compartment 11 while the auger discharge-end 19B is forwardly (and herein too upwardly) remote of the intake station 16A. Auger 18 is actuatably rotated by fluid motor 19F powered by tractor "pto" 96 through intervening hose 19H.

The elongate conveyor is necessarily provided with an external tubular housing to facilitate forwardly conveying the flowable cargo therealong from the wagon 10. For auger conveyor 18, a cylindrically tubular linear housing 20 is employed including a rearward end 20A connected to the wagon 10 as by means of an upright plate 22 attached to wagon front-panel 12 and surroundably attached to housing 20. Linear housing 20 has a fore-end 20F to which is attached fluid motor 19F and has an outlet-end (e.g., 20B) for discharging flowable cargo forwardly remote of the wagon (10). Herein, the outlet-end takes the form of a tubular-spout 20B attached to the underside of housing 20 adjacent to fore-end 20F and communicating with the housing 20 interior near auger discharge-end 19B.

There is a pivotal connection along a vertical hitch-axis 25V between the conveyor housing forward portion and the drayage vehicle 90. Thus, the overland trailing wagon 10 is free to pivotably follow the steerable (e.g., 98) drayage means. Herein, the pivotal connection comprises an upright cylindrical stud or lug 25 lying along hitch-axis 25V and depending from an overhead-bar 24 which is attached to the underside of an inverted U-shaped collar 23 which itself is semi-circularly attached to tubular housing 20 nearer the fore-end 20F than to the rearward end 20A thereof. Depending lug or stud 25 is journalled in a mating pillowblock 26 which is maintained loftily above tractor drawbar 93 with a lofty upright standard 27 rigidly attached to members 26 and 93. Thus, by virtue of the revolvable relationship between depending lug 25 and underlying pillowblock 26, the overland wagon 10 will readily follow the pathway of the steerable drayage or towing means (e.g., 90, "CP," etc.).

Figure 3:
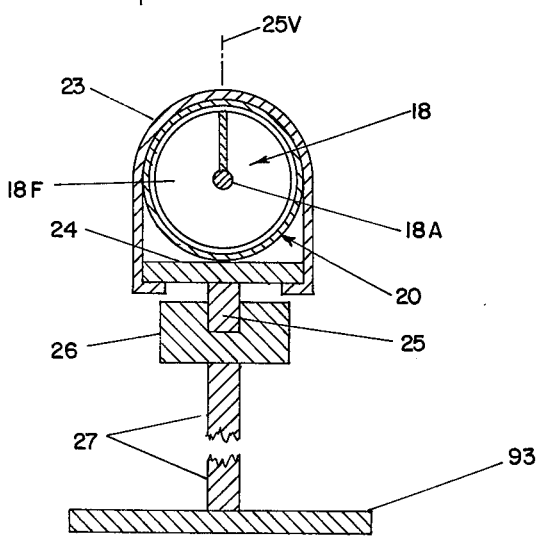
FIG. 3 is a sectional elevational view taken along lines 3—3 of FIGS. 1 and 2.
Figure 4:
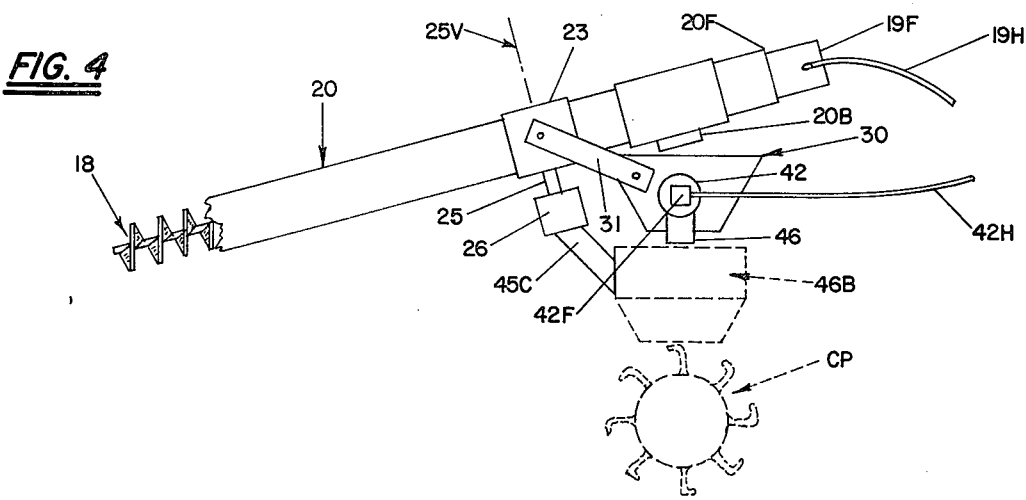
FIG. 4 is a side elevational view of the forward portions of the FIGS. 5 and 6 sophisticated embodiment.
Figure 5:
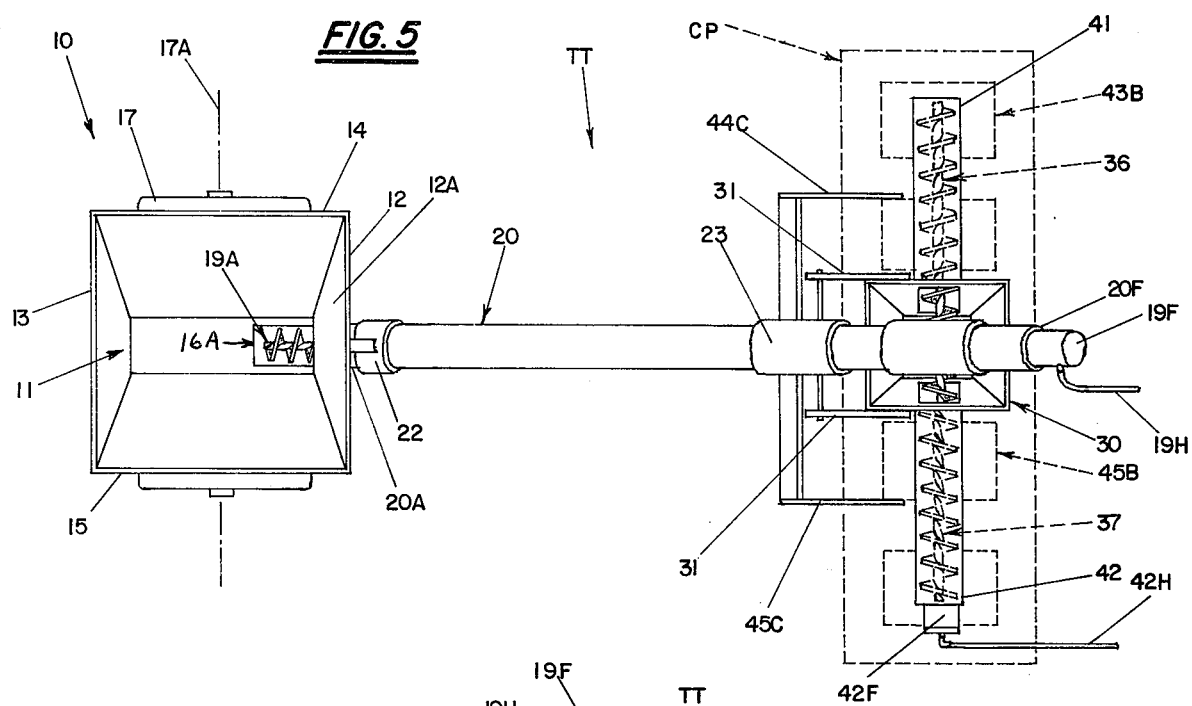
FIG. 5 is a top plan view showing a more sophisticated and refined embodiment of FIGS. 1–3, an agricultural corn planting machine depicted in phantom line being employed as the drayage means.
Figure 6:
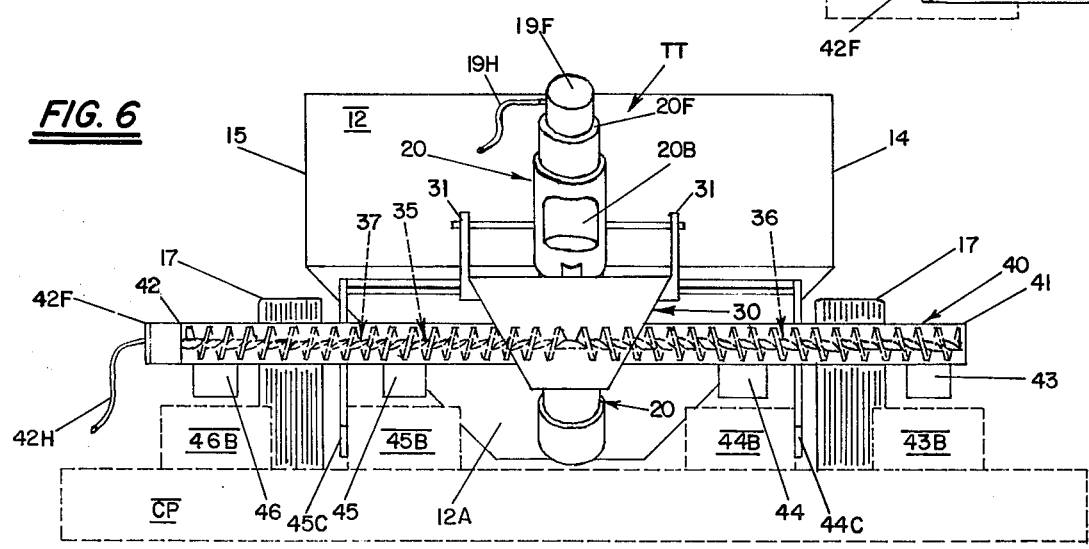
FIG. 6 is a forward elevational view of the FIGS. 4 and 5 embodiment.

The sophisticated embodiment "TT" of FIGS. 4–6 is based upon rudimentary embodiment "T" of FIGS. 1–3, but additionally comprises an intermediate-hopper 30 located in vertical alignment below the outlet-spout 20B for the primary conveyor (18). Herein, the said underlying location for intermediate-hopper 30 is established by a pair of rigid straps 31 depending from housing collar 23. There is a pair of substantially horizontal secondary-conveyors (e.g., 36, 37) communicating with the interior of the intermediate-hopper and extending lengthily in opposite lateral directions therefrom. As will be seen, the laterally extending secondary-conveyors are utilized to supply flowable cargo to cargo-holding bins, such as fertilizer bins 43B–46B spaced at lateral increments along an agricultural corn planting machine "CP." For such overland conventional corn planter "CP" as a drayage or towing means, in embodiment "TT" pillowblock 26 is supported upon a pair of sturdy braces 44C and 45C which might be conveniently attached to the corn planter "CP." For example, braces 44C and 45C are attached to bins 44B and 45B and converge upwardly and rearwardly therefrom to the attached pillowblock 26.

Herein, the elongate secondary-conveyor comprises a pair 35 of co-rotatable helical augers 36 and 37 each ultimately attached to and communicating with the intermediate-hopper 30. The leftward 36 and the rightward 37 lengths of secondary-conveyor type 35 are of approximate equal length but the pitches of the colinear horizontal augers 36 and 37 are of reverse angular directions to ensure cargo movement in the leftward and rightward directions of intermediate-hopper 30. The secondary-conveyor means, and herein both co-rotatable augers 36 and 37, is preferably powerably actuated from a single actuation means such as fluid motor 42F removably connected (through hose 42H) to the drayage means power supply e.g., 96, etc.

The secondary-conveyor means (e.g., 36, 37) is provided with underlying shielding (e.g., 40) laterally therealong to help move the cargo laterally. There is a plurality of upright delivery-spouts or chutes (e.g., 43–46) spaced along and respectively depending from the underlying shielding to deliver cargo to underlying cargo-holding bins (e.g., fertilizer-holding bins 43B–46B). Desireably, the secondary-conveyor underlying shielding comprises tubular shielding 40 surrounding augers 36 and 37 and also attached to intermediate-hopper 30. Tube 40 has laterally-separated closed ends 41 and 42, fluid motor 42F being shown mounted at end 42. Herein, cylindrically tubular upright delivery-spouts 43–46 are attached to and depend from the tube 40 and communicate with augers 36 and 37. Fertilizer-holding bins 43B–46B of the corn planter "CP" drayage/towing means underlie the respective delivery-spouts 43–46. Thus, it can be readily appreciated that with apparatus "TT" as a detachable 25 for the corn planter "CP," the operator need not periodically interrupt the corn planting task to journey to a remote fertilizer depot to replenish fertilizer-bins 43B–46B. Instead, a continuous supply to the herein representative working site of flowable cargo supply is generously available over a long term from the trailing rollable wagon 10.

From the foregoing, the construction and operation of the wagon with elongate housing as unloader and drayage hitch therefor will be readily understood and further explanation is believed to be unnecessary. However, since numerous modifications and changes will readily occur to those skilled in the art, it is not desired to limit the invention to the exact constructions shown and described, and accordingly, all suitable modifications and equivalents may be resorted to, falling within the scope of the appended claims.

I claim:

1. In combination with an overland tractor vehicle, a cargo-carrying rollable wagon having a cargo-storage compartment and including an elongate forwardly and upwardly extending power actuated conveyor lying along a vertical plane and having a rearward intake-end communicating with the wagon at the bottom front portion of the cargo-storage compartment and a forward discharge-end, said conveyor being provided with an external tubular housing connected to the wagon and also including a forward outlet spout depending from the housing adjacent the conveyor discharge-end, said conveyor tubular housing nearer the outlet thereof than to its rearward wagon connection having means for being removably pivotably attached to the tractor hitch for towing purposes, said means including a revolvable stud depending from the housing and lying along the hitch-axis and providing the pivotal connection to the forward tractor means.

2. The combination of claim 1 wherein the elongate forwardly extending conveyor is a helical auger having a cylindrically tubular housing.

3. The combination of claim 2 wherein the pivotably attached drayage means is a conventional corn planter apparatus equipped with a plurality of laterally spaced cargo-holding bins which might take the form of fertilizer-holding bins; wherein there is an intermediate-hopper communicating with the primary-conveyor discharge-end and located above said cargo-holding bins; wherein there is at least one horizontal laterally lineally extending secondary-conveyor attached to and communicating with the intermediate-hopper to move flowable cargo laterally therefrom, said at least one secondary-conveyor being provided with an underlying shielding therealong; wherein there is a plurality of upright delivery-spouts spaced along and depending from the secondary-conveyor shielding to deliver flowable cargo to underlying cargo-holding bins; and wherein the delivery-spouts overlie the respective cargo-holding bins of the pivotally attached corn planter drayage means.

4. The combination of claim 1 wherein there is an intermediate-hopper underlying the outlet-spout of the primary-conveyor housing and attached to said housing; and wherein there is at least one horizontal laterally extending secondary-conveyor communicating with the intermediate-hopper interior to move flowable cargo lineally laterally therefrom.

5. The combination of claim 4 wherein there is a pair of laterally extending and lineally-aligned secondary-conveyors communicating with the intermediate-hopper interior, each said secondary-conveyor being provided with an underlying shielding therealong; and wherein there is a plurality of upright delivery-spouts spaced along and respectively depending from the secondary-conveyor shielding to deliver cargo to underlying cargo-holding bins.

6. The combination of claim 5 wherein each of said secondary-conveyors is a helical auger powerably actuatably rotatable from the forward drayage means; and wherein each auger type secondary-conveyor is provided with surrounding tubular shielding.

7. The combination of claim 6 wherein the pivotably attached forward drayage means includes a conventional corn planter apparatus equipped with a plurality of laterally spaced distinct cargo-holding bins such as might be fertilizer-holding bins; wherein the intermediate-hopper is attached to the collar of the primary-conveyor tubular housing; wherein the secondary-conveyor comprises two co-rotatable helical augers rotated by a single actuation means; and wherein the delivery-spouts overlie the respective cargo-holding bins of the corn planter drayage means.

* * * * *